United States Patent
Vorbeck

(10) Patent No.: US 6,865,809 B2
(45) Date of Patent: Mar. 15, 2005

(54) METHOD OF PRELOADING TAPERED ROLLER BEARINGS

(75) Inventor: Bradford E. Vorbeck, Ypsilanti, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/409,034

(22) Filed: Apr. 8, 2003

(65) Prior Publication Data

US 2004/0200072 A1 Oct. 14, 2004

(51) Int. Cl.$^7$ .............................................. B23P 15/14
(52) U.S. Cl. ............... 29/893.1; 29/898.07; 29/898.09; 29/407.05; 33/517; 384/626
(58) Field of Search .............. 29/898.07, 898.09, 29/893.1, 407.05; 33/517; 384/626

(56) References Cited

U.S. PATENT DOCUMENTS

| | | | |
|---|---|---|---|
| 2,768,658 A | * 10/1956 | Galloway | 141/142 |
| 3,708,857 A | * 1/1973 | Pfeiffer | 29/407.05 |
| 4,336,641 A | * 6/1982 | Bhatia | 29/898.09 |
| 4,744,153 A | * 5/1988 | Brand | 33/517 |
| 4,821,602 A | * 4/1989 | Yasui et al. | 475/246 |
| 5,061,089 A | 10/1991 | Bair et al. | 384/535 |
| 5,502,882 A | * 4/1996 | Duta et al. | 29/407.05 |
| 5,836,076 A | * 11/1998 | Duta et al. | 29/893.1 |
| 6,095,940 A | 8/2000 | Ai et al. | 475/197 |
| 6,327,773 B1 | 12/2001 | Rode | 29/724 |

FOREIGN PATENT DOCUMENTS

| | | | |
|---|---|---|---|
| GB | 1572570 | * | 9/1977 |
| JP | 01-205942 | * | 8/1989 |
| JP | 10-133455 | * | 11/1999 |

* cited by examiner

Primary Examiner—Eric Compton
(74) Attorney, Agent, or Firm—Leslie C. Hodges

(57) ABSTRACT

A method is provided for achieving a desired preload on tapered roller bearings which rotatably support a gear between first and second transmission housing members in the assembly of a transmission. The bottom of each pocket which supports a tapered roller bearing is measured with respect to a mating face of the transmission case half. Shims are selected based upon these measurements so that each shim forms a reaction surface upon which the tapered roller bearings rest so that the appropriate preload is established with the case halves are bolted together.

16 Claims, 5 Drawing Sheets

| SHIM C FRT DIFF BRG | | | | | |
|---|---|---|---|---|---|
| DIMENSION A | DIMENSION B | SHIM PART NUMBER | SHIM THICKNESS | COLOR | MASS |
| 76.350 - 76.382 | 19.750 - 19.782 | 24215138 | 1.742 - 1.792 | BLUE | 0.0111 |
| 76.383 - 76.416 | 19.783 - 19.816 | 24215139 | 1.775 - 1.825 | BROWN | 0.0113 |
| 76.417 - 76.449 | 19.817 - 19.849 | 24215140 | 1.809 - 1.859 | NONE | 0.0115 |
| 76.450 - 76.482 | 19.850 - 19.882 | 24215141 | 1.842 - 1.892 | GREEN | 0.0118 |
| 76.483 - 76.516 | 19.883 - 19.916 | 24215142 | 1.875 - 1.925 | ORANGE | 0.0120 |
| 76.517 - 76.549 | 19.917 - 19.949 | 24215143 | 1.909 - 1.959 | PURPLE | 0.0122 |
| 76.550 - 76.582 | 19.950 - 19.982 | 24215144 | 1.942 - 1.992 | PINK | 0.0124 |
| 76.583 - 76.616 | 19.983 - 20.016 | 24215145 | 1.975 - 2.025 | WHITE | 0.0126 |
| 76.617 - 76.650 | 20.017 - 20.050 | 24215146 | 2.009 - 2.059 | BLACK | 0.0128 |

| SHIM D FRT DIFF BRG | | | | | |
|---|---|---|---|---|---|
| DIMENSION E | DIMENSION F | SHIM PART NUMBER | SHIM THICKNESS | COLOR | MASS |
| 63.450 - 63.482 | 65.850 - 65.882 | 24215129 | 1.796 - 1.846 | BLUE | 0.0111 |
| 63.483 - 63.516 | 65.883 - 65.916 | 24215130 | 1.829 - 1.879 | BROWN | 0.0113 |
| 63.517 - 63.549 | 65.917 - 65.949 | 24215131 | 1.863 - 1.913 | NONE | 0.0115 |
| 63.550 - 63.582 | 65.950 - 65.982 | 24215132 | 1.896 - 1.946 | GREEN | 0.0117 |
| 63.583 - 63.616 | 65.983 - 66.016 | 24215133 | 1.929 - 1.979 | ORANGE | 0.0119 |
| 63.617 - 63.649 | 66.017 - 66.049 | 24215134 | 1.963 - 2.013 | PURPLE | 0.0121 |
| 63.650 - 63.682 | 66.050 - 66.082 | 24215135 | 1.996 - 2.046 | PINK | 0.0123 |
| 63.683 - 63.716 | 66.083 - 66.116 | 24215136 | 2.029 - 2.079 | WHITE | 0.0125 |
| 63.717 - 63.750 | 66.117 - 66.150 | 24215137 | 2.063 - 2.113 | BLACK | 0.0127 |

METHOD OF PRELOADING TAPERED ROLLER BEARINGS

TECHNICAL FIELD

The present invention relates to a method of achieving a desired preload on tapered roller bearings which includes positioning shims at the bottom of bearing pockets to optimize a distance between the top of the shim and a mating face of the respective transmission housing member.

BACKGROUND OF THE INVENTION

Tapered roller bearings are frequently used to support rotatable gears in transmission assemblies. These tapered roller bearings require a static preload in order to function properly. The preload must be properly set to maximize durability, and to minimize spin loss and noise. Achieving a desired preload is particularly important in a three axis transmission wherein transverse forces exist between adjacent axes, which adds additional variability to the stack up of components, and could adversely affect the preload.

One prior art method of establishing preload is to provide a preload adjustment nut at the end of the differential axis and transfer axis. However, this requires additional parts and introduces additional leak paths into the design.

A further prior art method includes an internal bolted clamp which establishes the preload within the transmission. This method results in packaging problems and added cost as a result of the additional parts.

A further prior art method is the use of a specialized gauge which measures a distance from the middle of the tapered roller bearings on each axis to the face of the respective case cover. A shim is then selected and positioned in a transmission housing pocket based upon this measurement. This method can be expensive and complicated, and may be problematic because the transmission assembly becomes a matched set which can never be separated or reused in another transmission without repeating the measurement process. The gauge can also be very expensive to design and build.

SUMMARY OF THE INVENTION

The present invention stems from the realization that the majority of build variation in the stack up of a transmission assembly comes from the transmission housing. The machining of the tapered roller bearings and gears supported thereby is capable of providing an assembly manufactured within close tolerances. However, the transmission housing (case) is typically a large cast aluminum component which causes a significant portion of stack up build variation in an assembly which includes tapered roller bearings and rotatable gear(s) sandwiched between two transmission housing members.

The invention optimizes a distance between a reaction surface in a roller bearing pocket formed in the transmission housing members and a mating face of the transmission housing members. This is achieved by measuring the distance between the bottom of the pocket and the mating face of the transmission housing member, and selecting and placing a shim in the bottom of the pocket based upon this measurement to form the reaction surface against which the tapered roller bearing is positioned. This method is simpler and more cost effective than methods described previously.

More specifically, the invention provides a method of achieving a desired preload on tapered roller bearings which rotatably support a gear (or a plurality of gears) between first and second transmission housing members in the assembly of a transmission. The method includes measuring a first distance between a bottom of a first pocket in the first transmission housing member and a mating face of the first transmission housing. A first shim is then selected having a desired width based upon the measured first distance, and the first shim is positioned in the bottom of the first pocket. A second distance is measured between a bottom of a second pocket in the second transmission housing member and a mating face of the second transmission housing member. A second shim is selected based upon the measured second distance, and the second shim is positioned against the bottom of the second pocket. Tapered roller bearings are then positioned in the first and second pockets to rotatably support the gear between the tapered roller bearings. The mating faces of the first and second transmission housing members are bolted together to achieve the desired preload on the tapered roller bearings.

The desired preload on the tapered roller bearings is achieved by establishing between approximately 0.15 mm end play and approximately 0.25 mm interference fit between the tapered roller bearings and the first and second shims in the final assembled transmission.

An inventory of the shims may be maintained for selective use as the first and second shims. The shims preferably have widths varying in sequential steps of approximately 0.033 mm. The shims may be ring-shaped with a gap formed in the ring-shape to permit oil flow therethrough.

The step of positioning the tapered roller bearings in the first and second pockets includes pressing first and second tapered outer bearing cones into the first and second pockets against the respective first and second shims.

The method may also include verifying that correct shims were selected by measuring a third distance between the top (exposed surface) of the first shim and the mating face of the first transmission housing member and measuring a fourth distance between the top (exposed surface) of the second shim and the mating face of the second transmission housing member. Further, after the tapered outer bearing cones have been pressed into the pockets against the shims, a further verification measurement may be taken from the top of the tapered outer bearing cones to the mating faces of the respective transmission housing members.

Accordingly, the invention optimizes a distance between the mating faces of the transmission housing members and respective reaction surfaces formed by selected shims which are positioned in the bottoms of pockets which receive the tapered roller bearings. As a result of this optimization, the bearing load may be optimized, which enhances bearing life, reduces noise, and improves wear characteristics of the bearings.

The invention is useful in rotatably supporting a gear, a plurality of gears, a differential, or any other rotatable device to be supported within a transmission.

The above features and advantages of the invention as well as other features and advantages are readily apparent from the following detailed description of the best mode for carrying out the invention when taken in connection with the accompanying drawings.

DESCRIPTION OF THE PREFERRED EMBODIMENTS

Figure 1:
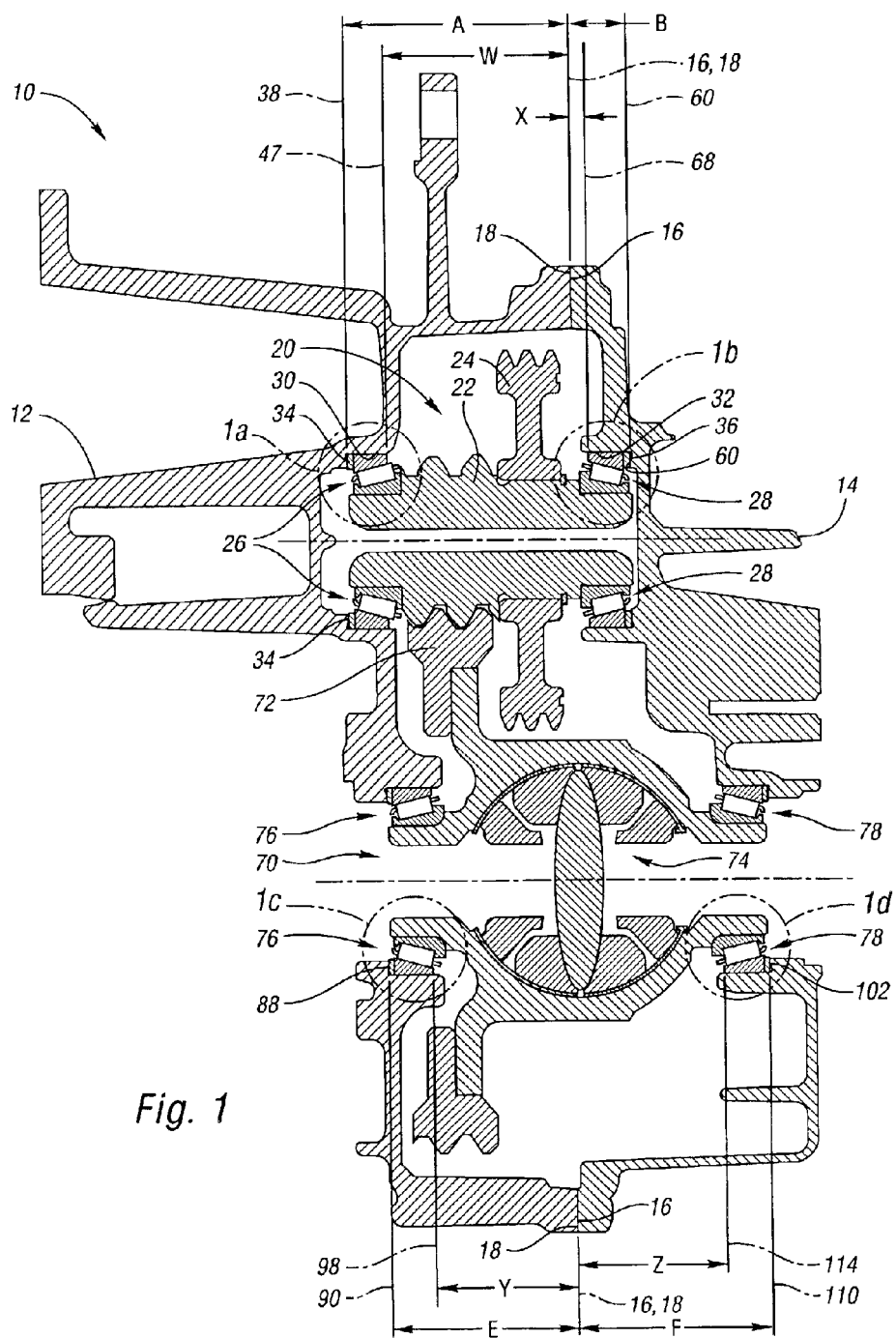
FIG. 1 shows a vertical cross sectional view of a transmission assembly in accordance with the invention.

Referring to FIG. 1, a partial cross sectional view is shown illustrating a front wheel drive transmission 10 in accordance with the invention. This transmission is shown only as an example. The invention is not limited to this configuration. The transmission 10 includes a first transmission housing member (or case half) 12 which is connected to a second transmission housing member (or converter housing) 14 wherein the respective mating faces 16, 18 of the first and second transmission housing members 12, 14 are bolted together.

Figure 1A:
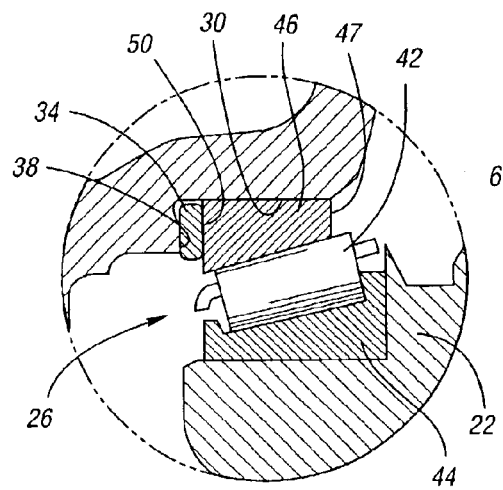
FIG. 1a shows an enlarged detail taken from FIG. 1.

The transmission 10 includes a transfer gear assembly 20, which includes the transfer shaft 22 and transfer gear 24. Tapered roller bearings 26, 28 are positioned at opposing ends of the transfer shaft 22 to rotatably support the transfer gear assembly 20. The tapered roller bearings are supported within the pockets 30, 32 formed in the first and second transmission housing members 12, 14, respectively. Shims 34, 36 are positioned in the bottoms 38, 40 of the respective pockets 30, 32. The tops of the shims 34, 36 form reaction surfaces against which the tapered bearings are supported. FIG. 1a shows an enlarged illustration of the bearing 26 within the pocket 30, and illustrates the position of the shim 34 against the pocket bottom 38. As shown, the tapered roller bearing 26 includes bearing members 42 which are rotatably supported by the inner and outer tapered bearing cones 44, 46.

Figures 2, 3, 4:
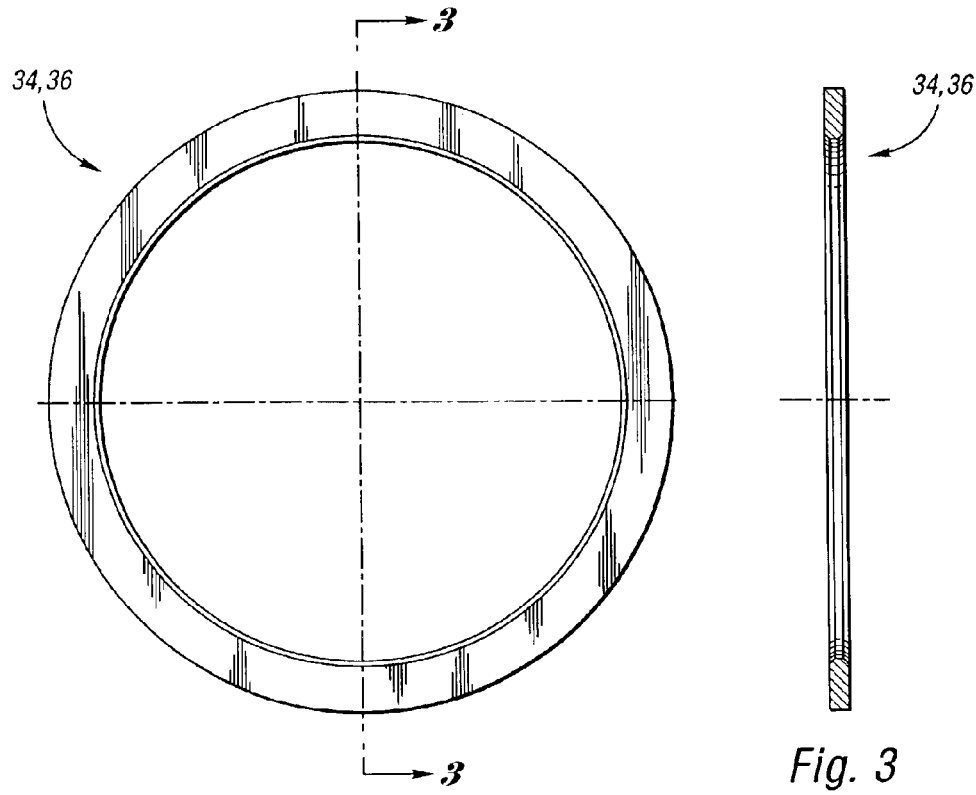
FIG. 2 shows a plan view of a shim for use with the transmission of FIG. 1.
FIG. 3 shows a cross sectional view taken at line 3—3 of FIG. 2.
FIG. 4 shows a lookup table for the selection of different shims for the transmission of FIG. 1 based upon measured dimensions.

Referring to FIG. 1, in order to select the shim 34 for the assembly, dimension A is first measured, which represents the distance between the mating face 16 of the first transmission housing member 12 and the pocket bottom 38 (shown in FIG. 1a). The shim 34 is illustrated in plan and sectional views, respectively, in FIGS. 2 and 3. The method of selection of the shim is illustrated in FIG. 4. Once the dimension A, as shown in FIG. 1, is measured, the lookup table of FIG. 4 determines which shim to select for placement in the pocket bottom 38. For example, if dimension A measures 76.400, then shim part number 24215139 would be selected, which has a shim thickness between 1.775 and 1.825 mm. The shim is color coded brown to ease the selection process. As illustrated in the lookup table of FIG. 4, the shims vary sequentially in width in steps of approximately 0.033 mm.

Once the shim 34 has been selected, it is placed against the bottom 38 of the pocket, and the outer taper bearing cone 46 is pressed into the pocket 30 against the top surface 50 of the shim 34. The top surface 50 forms a reaction surface against which the outer taper bearing cone 46 is pressed.

Before pressing the outer taper bearing cone 46 against the top surface 50 of the shim 34, a measurement is taken from the top (exposed) surface 50 of the shim 34 to the mating face 16 of the first transmission housing member 12, and this measurement is compared to a desired value to verify that the correct shim has been selected.

After the outer tapered bearing cone 46 has been pressed against the shim 34, the dimension W is measured from the top 47 of the outer tapered bearing cone 46 (shown in FIG. 1a) to the mating face 16 of the first transmission housing member 12. By taking this measurement W, the assembler again verifies that the proper shim was selected for the assembly and assures that no dirt or chips got under the bearing cone.

Figure 1B:
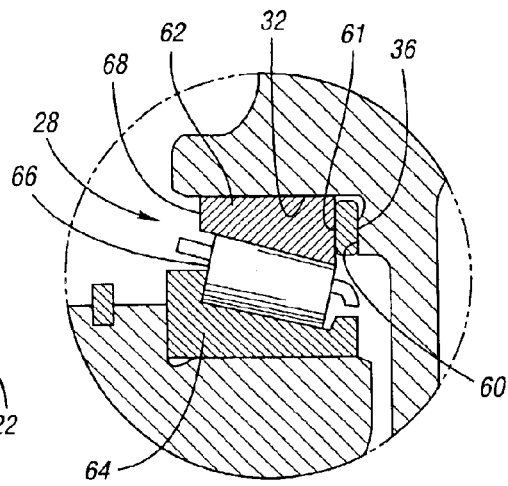
FIG. 1b shows an enlarged detail taken from FIG. 1.

A similar process is used to select the shim 36. The shim 36 is selected by measuring the dimension B shown in FIG. 1, which is the distance between the mating face 18 of the second transmission housing member 14 and the bottom 60 of the pocket 32 (also shown in FIG. 1b). By way of example, if the dimension B measures 19.960 mm, referring to the lookup table of Table 4, shim part number 24215144 is selected, having a shim thickness between 1.942 and 1.992 mm. This shim is color coded pink to ease selection. The selected shim 36 is then placed in the pocket 32. After the shim 36 is placed in the pocket 32, a measurement is taken from the top (exposed) surface 61 (shown in FIG. 1b) of the shim 36 to the mating face 18 of the second transmission housing member 14, and that measurement is compared to a desired value to verify that the correct shim has been selected. The outer tapered bearing cone 62, which is best viewed in FIG. 1b, is then pressed into the pocket 32 against the shim 36. As shown in FIG. 1b, the tapered roller bearing 28 includes the outer tapered bearing cone 62, inner tapered bearing cone 64, and bearing members 66.

After the outer tapered bearing cone 62 has been pressed into the pocket 32, a dimension X, shown in FIG. 1, is measured between the mating face 16 of the second transmission housing member 14, and the top surface 68 of the outer tapered bearing cone 62 (also shown in FIG. 1b). This measurement X again verifies that the proper shim was selected and that no dirt or chips got under the bearing cone.

Figure 1C:
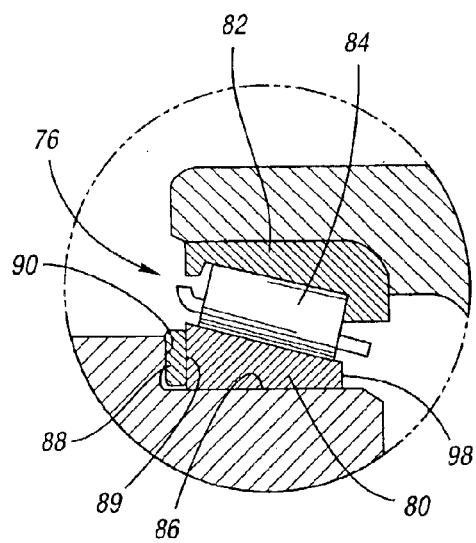
FIG. 1c shows an enlarged detail taken from FIG. 1.

As shown in FIG. 1, the transmission 10 also includes the differential assembly 70, which includes the outer gear 72 and inner gears 74. These gears 72, 74 are rotatably supported in the transmission 10 by the tapered roller bearings 76, 78. As illustrated in FIG. 1c the tapered roller bearing 76 includes an outer tapered bearing cone 80, an inner tapered bearing cone 82, and roller bearings 84 therebetween. The tapered roller bearing 76 is positioned within the pocket 86 against the shim 88.

Similar to the selections of the shims 34, 36 described above, the shim 88 is selected by measuring the dimension E shown in FIG. 1. The dimension E represents the distance between the mating face 16 of the first transmission housing member 12 and the bottom 90 of the pocket 86 (also shown in FIG. 1c).

Figures 5, 6, 7:
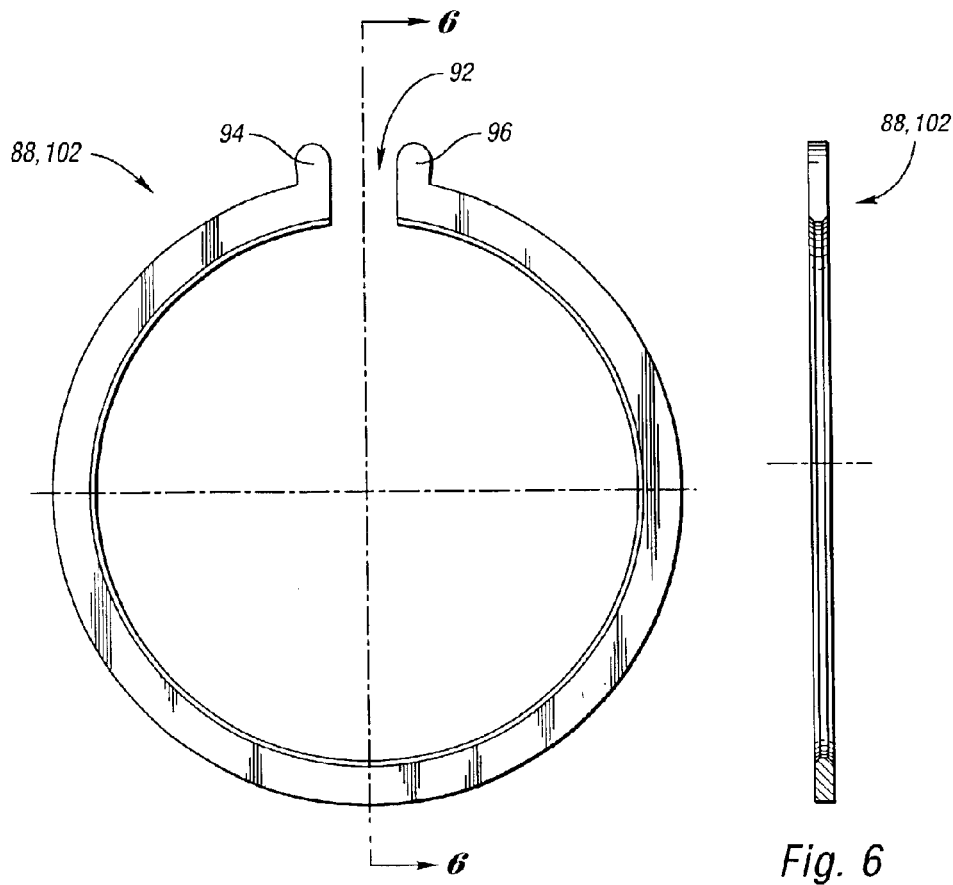
FIG. 5 shows a plan view of a shim for use with the transmission of FIG. 1.
FIG. 6 shows a cross sectional view taken at line 6—6 of FIG. 5.
FIG. 7 shows a lookup table for the selection of different shims for the transmission of FIG. 1 based upon measured dimensions.

The shim 88 is shown in greatest detail in FIGS. 5 and 6. As shown in FIG. 5, the shim 88 is substantially ring-shaped, with a gap 92 formed between distal protrusions 94, 96 to permit oil flow through the gap 92. Referring to the lookup table of FIG. 7, by way of example, if the measured dimension E between the bottom 90 of the pocket 86 and the mating face 16 of the first transmission housing member 12 is 63.500, shim part number 24215130 would be selected, having a shim thickness between 1.829 and 1.879 mm. This shim is color coded brown to ease selection. After the shim 88 has been selected, it is placed against the bottom 90 of the pocket 84. To verify the selection of the proper shim, a distance is measured between the top surface 89 (shown in FIG. 1c) of the shim 88 and the mating face 16 of the first transmission housing member. The measured dimension is compared to a desired value to verify that the proper shim has been selected.

The outer tapered bearing cone 80, shown in FIG. 1c, is then pressed into the pocket 86 against the shim 88. The top surface 89 of the shim 88 forms a reaction surface against which the tapered bearing cone 80 is positioned. After the outer tapered bearing cone 80 has been pressed into the pocket 86, the measurement Y is taken as shown in FIG. 1. The measurement Y determines the distance from the mating face 16 of the first transmission housing member 12 to the top 98 (shown in FIG. 1c) of the outer tapered bearing cone 80. This dimension Y is used to again verify that the appropriate shim was selected, and that no dirt or scraps got under the bearing cone.

Figure 1D:
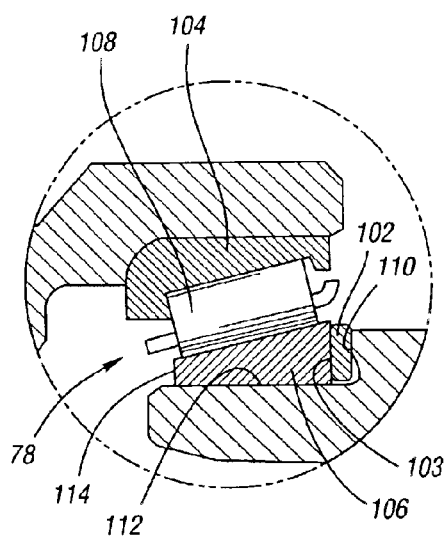
FIG. 1d shows an enlarged detail taken from FIG. 1.

The selection of the shim 102 for use with the tapered roller bearing 78 is a similar process. As shown in FIG. 1d, the tapered roller bearing 78 includes the inner tapered bearing cone 104 and outer tapered bearing cone 106, with the bearing 108 therebetween. As shown in FIGS. 1 and 1d, the dimension F is measured between the mating face 18 of the second transmission housing member and the bottom 110 of the pocket 112 which receives the tapered roller bearing 78. Referring to the lookup table of FIG. 7, by way of example, if the measured dimension F is 66.000 mm, shim part number 24215133 would be selected, having a thickness between 1.929 and 1.979 mm. This shim is color coded orange to ease selection. The selected shim 102 is then placed against the bottom 110 of the pocket 112. Again, the distance from the top 103 (shown in FIG. 1d) of the shim 102 to the mating face 18 is measured and compared to a desired value to verify that the proper shim was selected. The outer tapered bearing cone 106 is then pressed into the pocket 112 against the shim 102. The top surface 103 of the shim 102 forms a reaction surface against which the tapered bearing cone 106 is positioned. After the outer tapered bearing cone 106 has been pressed against the shim 102, the dimension Z (shown in FIG. 1) is measured between the mating face 18 of the second transmission housing member 14 and the top 114 of the outer tapered bearing cone 106 (as shown in FIG. 1d). The measurement Z again verifies that the proper shim was selected, and that no dirt or scraps got under the bearing cone.

Figure 8:
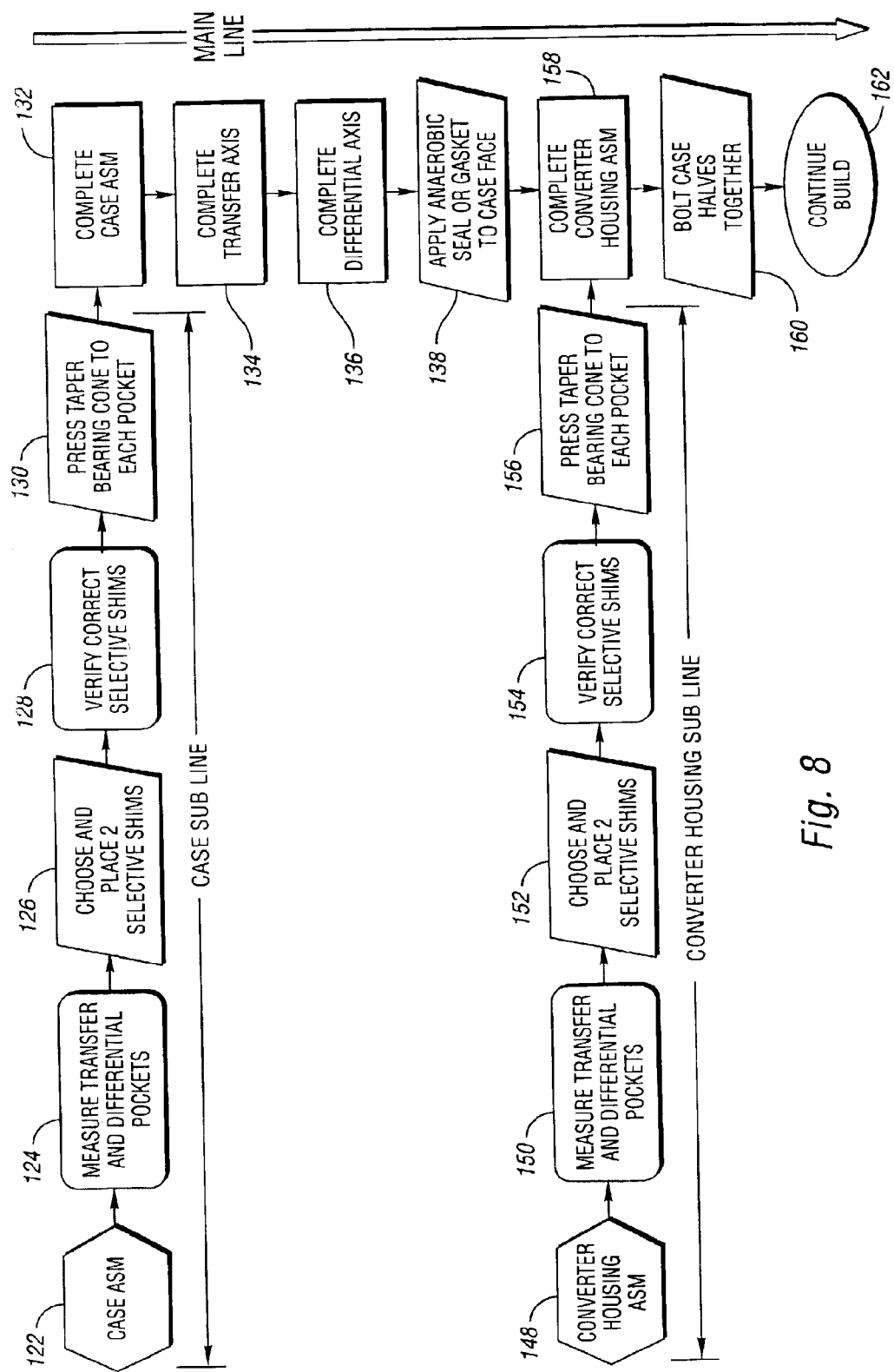
FIG. 8 shows a schematic flow diagram of a method of assembly in accordance with the present invention.

Turning to FIG. 8, a process flow diagram 120 illustrates a preferred sequence in manufacturing a transmission as described above with reference to FIGS. 1–7. As shown, the subassembly line begins with a partially assembled case assembly 122 (including the previously described transmission housing member 12). The previously described dimensions A and E shown in FIG. 1 are then measured to determine the transfer and differential pocket dimensions, as illustrated at step 124. The previously described shims 34, 88 are then selected and placed into the pockets at step 126. At step 128, measurements are taken between the mating face 16 and the tops of the shims, as previously described, to verify correct shim selection. After this verification, the remainder of the bearing cone assembly is assembled into each pocket at step 130. Dimensions W and Y may also be taken, as described previously. Steps 132, 134 and 136 indicate the completion of the case assembly, the completion of the transfer gear assembly, and the completion of the differential assembly. At step 138, an anaerobic seal or gasket seal is applied to the mating face 16 of the case (first transmission housing member 12).

Along the converter housing subassembly line, at step 148, a converter housing assembly is received, including the previously described second transmission housing member 14. At step 150, the dimensions B and F are measured to determine the pocket depths with respect to the mating face 18 of the second transmission housing member 14. The shims 36, 102 are then selected at step 152 using the lookup tables of FIGS. 4 and 7. The shims are then placed into the pockets, and a measurement is taken from the tops of the shims to the mating face 18 of the transmission housing member to verify that the correct shims have been selected, as represented by step 154. At step 156, the outer tapered bearing cones are pressed into each pocket against the shims. At this point, the dimensions X and Z, shown in FIG. 1, are measured to again determine that the appropriate shims have been selected, and that no other dimensional problems have arisen.

At step 158, the converter housing assembly is completed. At step 160, the first and second transmission housing members 12, 14 are bolted together to apply the appropriate preload on the tapered roller bearings. At step 162, the assembly of the transmission continues along the main assembly line.

The desired preload on the tapered roller bearings is achieved by establishing between approximately 0.15 mm "end play" and approximately 0.025 mm interference fit between the tapered roller bearings and the first and second shims in the final assembled transmission. The term "end play" refers to a gap or loose fit between components in the stack-up, and the "interference fit" results in flexing of the transmission housing when the two transmission housing members are bolted together. This range of 0.15 to –0.25 mm fit tolerance translates into the desired range of preload force values.

While the best mode for carrying out the invention has been described in detailed, those familiar with the art to which this invention relates will recognize various alternative designs and embodiments for practicing the invention within the scope of the appended claims.

What is claimed is:

1. A method of achieving a desired preload on tapered roller bearings which rotatably support a rotatable device between first and second transmission housing members in the assembly of a transmission without measuring the rotatable device, the method comprising:

measuring a first distance between a bottom of a first pocket and a mating face of the first transmission housing member;

selecting a first shim having a desired width based upon the measured first distance;

positioning the first shim in said first pocket;

measuring a second distance between a bottom of a second pocket and a mating face of the second transmission housing member;

selecting a second shim having a desired width based upon the measured second distance;

positioning the second shim against the bottom of said second pocket;

positioning tapered roller bearings in said first and second pockets to rotatably support the rotatable device between the tapered roller bearings; and mating faces of the first and second transmission housing members together after measuring the first and second distances without measuring the rotatable device to thereby achieve the desired preload on the tapered roller bearings.

2. The method of claim 1, wherein said desired preload on the tapered roller bearings is achieved by establishing between approximately 0.15 mm end play and approximately 0.25 mm interference fit between the tapered roller bearings and the first and second shims in the final assembled transmission.

3. The method of claim 1, wherein said step of positioning tapered roller bearings in said first and second pockets comprises pressing first and second tapered bearing cones into the first and second pockets against the respective first and second shims.

4. The method of claim 1, further comprising maintaining an inventory of shims for selective use as said first and second shims, wherein the inventory of shims have widths varying in sequential steps of approximately 0.033 mm.

5. The method of claim 4, wherein said shims are ring-shaped with a gap formed in the ring-shape to permit oil flow therethrough.

6. A method of achieving a desired preload on tapered roller bearings which rotatably support a gear between first and second transmission housing members in the assembly of a transmission, the method comprising:

measuring a first distance between a bottom of a first pocket and a mating face of the first transmission housing member;

selecting a first shim having a desired width based upon the measured first distance;

positioning the first shim in said first pocket;

measuring a second distance between a bottom of a second pocket and a mating face of the second transmission housing member;

selecting a second shim having a desired width based upon the measured second distance;

positioning the second shim against the bottom of said second pocket;

positioning tapered roller bearings in said first and second pockets to rotatably support the gear between the tapered roller bearings;

bolting the mating faces of the first and second transmission housing members together to achieve the desired preload on the tapered roller bearings; and verifying that correct shims were selected by measuring a third distance between the top of the first shim and the mating face of the first transmission housing member, and measuring a fourth distance between the top of the second shim and the mating face of the second transmission housing member.

7. A method of achieving a desired preload on tapered roller bearings which rotatably support a rotatable device between first and second transmission housing members in the assembly of the transmission, the method comprising:

optimizing a distance between a mating face of the first transmission housing member and a first reaction surface in a first pocket by selecting and positioning a first shim of a desired width in the bottom of the first pocket such that a top surface of the first shim forms the first reaction surface;

positioning a first tapered roller bearing against the first reaction surface;

optimizing a distance between a mating face of a second transmission housing member and a second reaction surface of a second pocket by selecting and positioning a second shim having a desired width against the bottom of the second pocket such that a top surface of the second shim forms said second reaction surface in the second pocket;

positioning a second tapered roller bearing against the second reaction surface in the second pocket;

rotatably supporting the rotatable device between the first and second tapered roller bearings; and attaching the mating faces of the first and second transmission housing members together to thereby achieve the desired preload on the tapered roller bearings without requiring a measurement of the rotatable device to establish the preload.

8. The method of claim 7, wherein said desired preload on the tapered roller bearings is achieved by establishing between approximately 0.15 mm end play and approximately 0.25 mm interference fit between the tapered roller bearings and the first and second shims in the final assembled transmission.

9. The method of claim 7, wherein said positioning of the first and second tapered roller bearings in the first and second pockets comprises pressing first and second tapered bearing cones into the first and second pockets against the respective first and second shims.

10. The method of claim 7, further comprising maintaining an inventory of shims for selective use as said first and second shims, wherein the inventory of shims have widths varying in sequential steps of approximately 0.033 mm.

11. The method of claim 10, wherein said shims are ring-shaped with a gap formed in the ring-shape to permit oil flow therethrough.

12. A method of achieving a desired preload when assembling a rotatable device to be rotatably supported by tapered roller bearings between first and second transmission housing members which may cause stack up build variation in a transmission assembly, the method comprising:

measuring a first distance between a bottom of a first pocket and a mating face of the first transmission housing member;

selecting a first shim having a desired width based upon the measured first distance;

positioning the selected first shim in said first pocket;

pressing a first tapered bearing cone into said first pocket against said first shim;

measuring a second distance between a bottom of a second pocket and a mating face of the second transmission housing member;

selecting a second shim having a desired width based upon the measured second distance;

positioning the second shim in said second pocket, and pressing a second tapered bearing cones into said second pocket against said second shim;

assembling the rotatable device between the first and second tapered bearing cones after measuring the first and second distances without measuring the rotatable device; and connecting the mating faces of the first and second transmission housing members together to thereby achieve the desired preload.

13. The method of claim 12, wherein said desired preload on the tapered roller bearings is achieved by establishing between approximately 0.15 mm end play and approximately 0.25 mm interference fit between the tapered roller bearings and the first and second shims in the final assembled transmission.

14. The method of claim 12, further comprising maintaining an inventory of shims for selective use as said first and second shims, wherein the inventory of skims have widths varying in sequential steps of approximately 0.033 mm.

15. The method of claim 14, wherein said shims are ring-shaped shaped with a gap formed in the ring-shape to permit oil flow therethrough.

16. A method of achieving a desired preload when assembling a gear rotatably supported by tapered roller bearing between first and second transmission housing members in a transmission assembly, the method comprising:

measuring a first distance between a bottom of a first pocket and a mating face of the first transmission housing member;

selecting a first shim having a desired width based upon the measured first distance;

positioning The selected first shim in said first pocket;

pressing a first tapered bering cone into said first pocket against said first shim;

measuring a second distance between a bottom of a second pocket and a mating face of the second transmission housing member;

selecting a second shim having a desired width based upon the measured positioning the second shim in said second pocket and pressing a second tapered bearing cone into said second pocket, against said second shim;

assembling the gear between the first and second tapered bearing cones, and connecting the mating faces of the first and second transmission housing members together to achieve the desired preload; and prior to said pressing steps, verifying that correct shims were selected by measuring a third distance between the top of the first shim and the mating face of the first transmission housing member, and measuring a fourth distance between the top of the second shim and the mating face of the second transmission housing member.

\* \* \* \* \*